United States Patent
Del-Gallo et al.

(10) Patent No.: US 8,337,724 B2
(45) Date of Patent: Dec. 25, 2012

(54) ADDITION OF (A) BLOCKING AGENT(S) IN A CERAMIC MEMBRANE FOR BLOCKING CRYSTALLINE GROWTH OF GRAINS DURING ATMOSPHERIC SINTERING

(75) Inventors: Pascal Del-Gallo, Dourdan (FR); Thierry Chartier, Feytiat (FR); Gregory Etchegoyen, Rilhac-Rancon (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/151,970

(22) Filed: Jun. 2, 2011

(65) Prior Publication Data
US 2011/0298165 A1    Dec. 8, 2011

Related U.S. Application Data

(63) Continuation of application No. 10/577,867, filed as application No. PCT/FR2004/002851 on Nov. 5, 2004, now Pat. No. 7,955,526.

(30) Foreign Application Priority Data

Nov. 6, 2003 (FR) .................................. 03 50802

(51) Int. Cl.
*H01B 1/00*    (2006.01)
(52) U.S. Cl. ........ 252/500; 501/123; 501/137; 501/152; 505/120
(58) Field of Classification Search .................. 252/500; 75/244; 427/243; 419/10, 12; 429/432; 501/98.1, 123, 137, 152; 505/120
See application file for complete search history.

(56) References Cited

U.S. PATENT DOCUMENTS

| | | | |
|---|---|---|---|
| 5,306,411 A | 4/1994 | Mazanec et al. | |
| 5,478,444 A | 12/1995 | Liu et al. | |
| 5,534,471 A * | 7/1996 | Carolan et al. ................ | 502/4 |
| 5,624,542 A * | 4/1997 | Shen et al. ................... | 204/283 |
| 5,911,860 A | 6/1999 | Chen et al. | |
| 6,146,549 A | 11/2000 | Mackay et al. | |
| 6,187,157 B1 | 2/2001 | Chen et al. | |
| 6,332,964 B1 | 12/2001 | Chen et al. | |
| 6,471,921 B1 | 10/2002 | Van Calcar et al. | |
| 2001/0002990 A1 | 6/2001 | MacKay et al. | |
| 2002/0022568 A1 | 2/2002 | Mackay et al. | |

FOREIGN PATENT DOCUMENTS

| | | |
|---|---|---|
| WO | WO 99/21649 | 5/1999 |
| WO | WO 00/59613 | 10/2000 |

OTHER PUBLICATIONS

PCT International Search Report for PCT/FR2004/002851, mailed Apr. 6, 2005.

* cited by examiner

*Primary Examiner* — Khanh Tuan Nguyen
(74) *Attorney, Agent, or Firm* — Christopher J. Cronin

(57) ABSTRACT

A method of preparing a composite includes the following steps. A powder blend is sintering while an oxygen partial pressure ($pO_2$) of a gaseous atmosphere surrounding the powder blend is controlled. Before the sintering, a shape is formed from the powder blend. After the forming and before the sintering, binder is removed from the powder blend. The powder blend comprises binder, a mixed electronic/oxygen $O^{2-}$ anionic conducting compound ($C_1$) and a compound ($C_2$) chosen from MgO and $BaTiO_3$. The resultant composite comprises at least 75 vol % of compound ($C_1$), from 0.01 to 25 vol % of compound ($C_2$), and from 0 vol % to 2.5 vol % of compound ($C_3$).

17 Claims, 9 Drawing Sheets

Addition of MgO (5 vol%) in a ceramic matrix

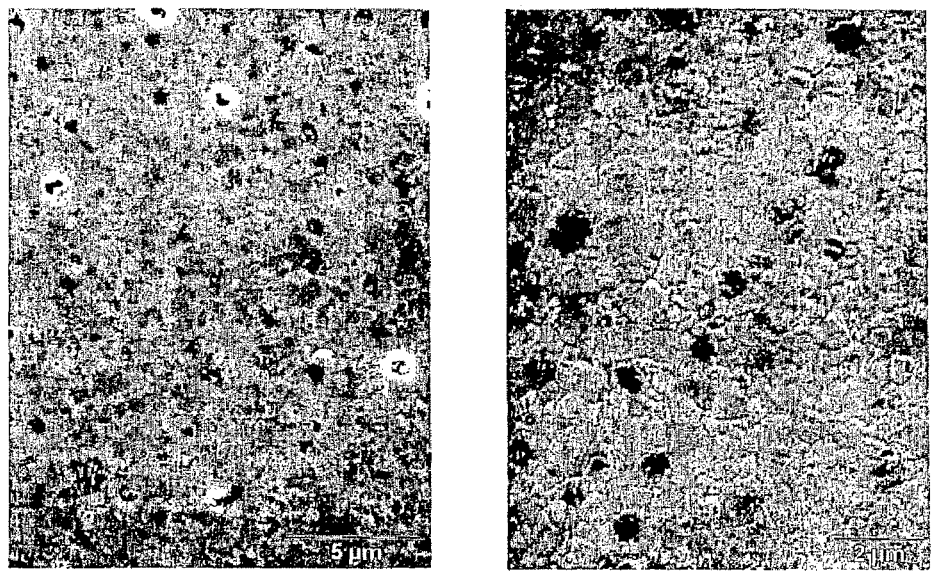
Figure 1: Addition of MgO (5 vol%) in a ceramic matrix

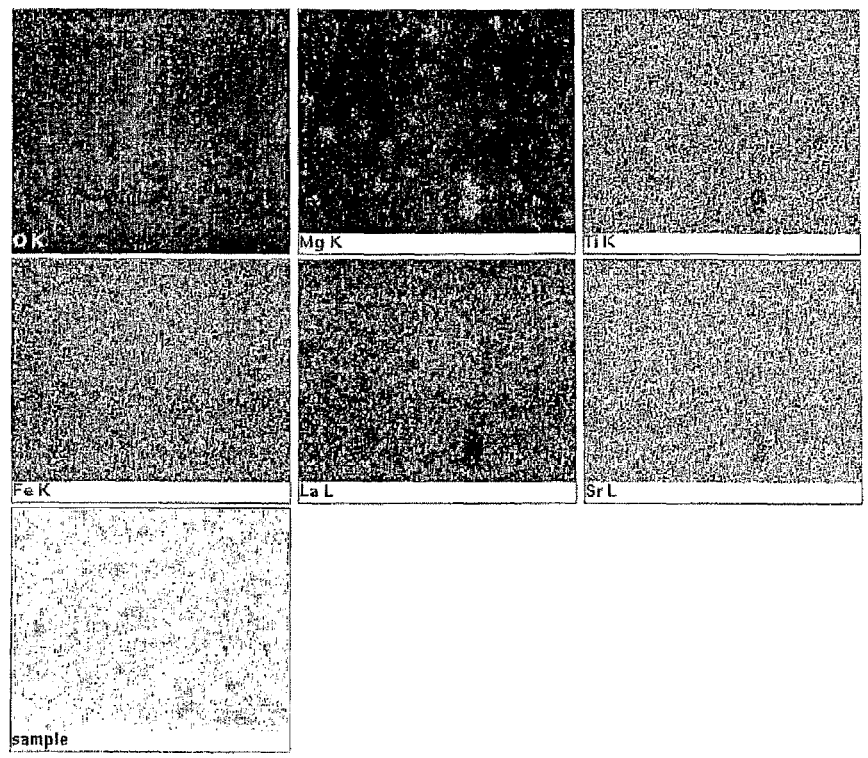
Figure 2: Maps for the elements Mg, Sr, La, Fe and Ti in the ceramic matrix

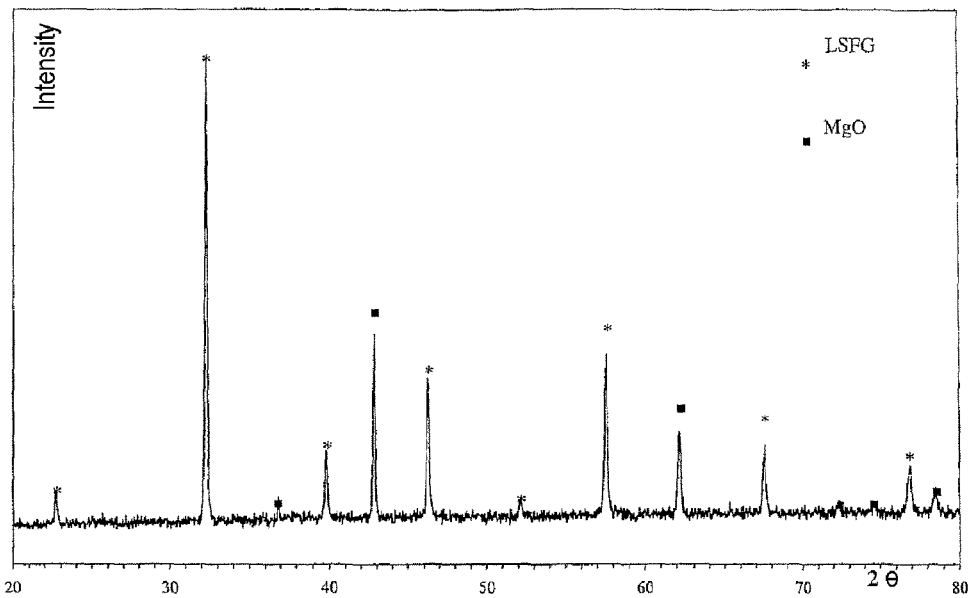
Figure 3: X-ray diffraction diagram of the LSFG/MgO composite
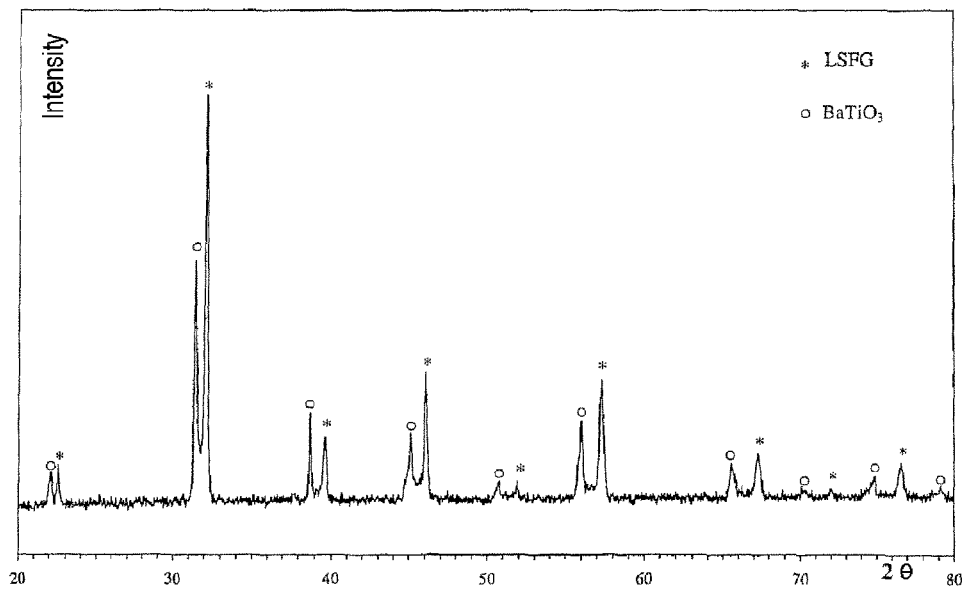
Figure 4: Diffraction diagram of an LSFG/BaTiO$_3$ composite

ADDITION OF (A) BLOCKING AGENT(S) IN A CERAMIC MEMBRANE FOR BLOCKING CRYSTALLINE GROWTH OF GRAINS DURING ATMOSPHERIC SINTERING

CROSS-REFERENCE TO RELATED APPLICATIONS

This application is a continuation of U.S. application Ser. No. 10/577,867, filed May 8, 2007, now U.S. Pat. No. 7,955,526 which is a 371 of International PCT Application PCT/FR04/82851, filed Nov. 5, 2004, the entire contents of which are incorporated herein by reference.

BACKGROUND OF THE INVENTION

The subject of the present invention is a mixed electronic/$O^{2-}$ anionic conducting composite, its method of preparation and its use as solid electrolyte in a catalytic membrane reactor intended in particular for the production of syngas by the reforming of methane or natural gas.

Catalytic membrane reactors, called CMRs hereafter, produced from ceramics, are used for separating oxygen from air by diffusion of this oxygen in ionic form through the ceramic and the chemical reaction of the latter with natural gas (mainly methane) on catalytic sites (Ni or noble metal particles) deposited on the surface of the membrane. Conversion of syngas into liquid fuel by the GTL (Gas To Liquid) process requires an $H_2/CO$ molar ratio of 2. This ratio of 2 can be obtained directly by a process involving a CMR.

However, ceramics are brittle in behavior and have mechanical properties that depend directly on the microstructure (shape and size of the grains, secondary phases, porosity). All other things being equal, the mechanical strength of a ceramic used as a CMR increases when the grain size of which the ceramic is composed decreases. The grain size may increase during operation at temperature and limit the lifetime of the system. Various publications disclose solutions intended to improve this lifetime.

U.S. Pat. No. 5,306,411 and U.S. Pat. No. 5,478,444 disclose composites consisting of a mixture of an electronic conducting material and an ionic conducting material, thus constituting a solid electrolyte of mixed conductivity.

U.S. Pat. No. 5,911,860 discloses a material essentially consisting of a mixed or ionic conductor and of a constituent with a chemical nature different from the mixed conductor, preferably a metal with a content of 0 to 20 wt %. This publication highlights the need for a second phase in order to limit cracking of the material during sintering and thus to increase its mechanical properties while improving its catalytic efficiency.

U.S. Pat. No. 6,187,157 discloses multiphase systems comprising a mixed ionic/electronic conducting phase or just an ionic conducting phase and a second electronic conducting phase so as to improve the catalytic properties of the material. The secondary phase is generally metallic and occupies 13% of the volume of the material.

U.S. Pat. No. 6,332,964 discloses either a dense membrane or a porous support consisting of a phase comprising a mixed metal oxide of ionic conductivity of the $MCeO_x, MZrO_x$ type (M: family of lanthanides) or mixed conductivity (LaSrGaMgO$_x$) and of a second phase having an electronic conductivity (metal, metal alloy or mixed oxide of the LaSrMO$_x$ type where M=transition element), said second phase being between 1 and 30 vol % of the matrix. United States patent application US 2002/0022568 discloses a material of formula $Ln_{1-x}Sr_yCa_{x-y}MO_{3-\delta}$ (Ln: family of lanthanides and yttrium, or a mixture of the two; M: transition metal or mixture of transition metals) having a high mixed conductivity, a low thermal expansion coefficient and improved mechanical properties. U.S. Pat. No. 6,471,921 discloses a mixed conducting multiphase material whose secondary phases do not participate significantly in the conduction but do increase the mechanical properties of the material. The secondary phases result from a departure from stoichiometric mixing of the precursors used to synthesize the mixed conductor and are therefore by-products of the reaction. The content of secondary phases is between 0.1 and 20 wt %. The main material is a brown-millerite phase of structure $A_xA'_{x'}A''_{(2-x-x')}B_yB'_{y'}B''_{(2-y-y')}O_{5+z}$ and the secondary phases have compositions $(A,A')_2(B,B')O_4$, $A'_2(B,B')O_4$, $(A,A')(B,B')_2O_4$, . . . etc. All these secondary phases result from the reaction for synthesizing the material. They are not added before the forming of the material.

The Applicant has sought to develop a composite that has a fine uniform structure with grains having a size close to one micron, thereby guaranteeing high and lasting mechanical properties.

BRIEF SUMMARY OF THE INVENTION

This is why, according to a first aspect, one subject of the invention is a composite (m) comprising:
- at least 75 vol % of a mixed electronic/oxygen $O^{2-}$ anionic conducting compound ($C_1$) chosen from doped ceramic oxides which, at the use temperature, are in the form of a crystal lattice having oxide ion vacancies and more particularly in the form of a cubic phase, fluorite phase, aurivillius-type perovskite phase, brown-millerite phase or pyrochlore phase; and
- from 0.01 to 25 vol % of a compound ($C_2$), different from compound ($C_1$), chosen from ceramics of oxide type, ceramics of nonoxide type, metals, metal alloys or mixtures of these various types of materials; and from 0 vol % to 2.5 vol % of a compound ($C_3$) produced from at least one chemical reaction represented by the equation:

$$xF_{C1} + yF_{C2} \rightarrow zF_{C3},$$

in which equation $F_{C1}$, $F_{C2}$ and $F_{C3}$ represent the respective crude formulae of compounds $C_1$, $C_2$ and $C_3$ and x, y and z represent rational numbers greater than or equal to 0.

In the presentation that follows, compound ($C_2$) is often referred to as a blocking agent, in that its presence in the composite according to the present invention inhibits crystalline growth of the grains of compound ($C_1$) during one or more of the steps of the method for its manufacture. The grains of the blocking agent preferably have a shape that can lie within a sphere with a diameter ranging from 0.1 μm to 5 μm, and preferably less than 1 μm, whether the grains are of equiaxed shape or are acicular grains, with a length of 5 μm or less.

The expression "compound ($C_1$) or ($C_2$)" means that the composite as defined above may comprise:
- either a compound ($C_1$) mixed with a single compound ($C_2$);
- or a combination of several compounds ($C_1$) mixed with a single compound ($C_2$);
- or a compound ($C_1$) mixed with a combination of several compounds ($C_2$);
- or a combination of several compounds ($C_1$) mixed with a combination of several compounds ($C_2$).

The term "volume fraction" is understood to mean, in the definition of the composite according to the present invention, the volume fraction in the final composite.

According to a first preferred embodiment of the present invention, the volume fraction of compound ($C_3$) in the composite does not exceed 1.5% and more particularly it does not exceed 0.5% by volume.

According to one particular aspect of this preferred embodiment, compound ($C_2$) is essentially chemically inert with respect to compound ($C_1$) over the temperature range lying between room temperature and the sintering temperature, this range including the operating temperature, and the volume fraction of compound ($C_3$) in the composite tends toward 0.

According to a second preferred aspect of the present invention, the volume fraction of compound ($C_2$) is not less than 0.1% but does not exceed 10%, and more particularly the volume fraction of compound ($C_2$) does not exceed 5% but is not less than 1%.

In the composite as defined above, compound ($C_2$) is mainly chosen:
- either from oxide-type ceramics, such as for example magnesium oxide (MgO), calcium oxide (CaO), aluminum oxide ($Al_2O_3$), zirconium oxide ($ZrO_2$), titanium oxide ($TiO_2$), mixed strontium aluminum oxides $SrAl_2O_4$ or $Sr_3Al_2O_6$, mixed oxides of perovskite structure, such as for example $BaTiO_3$ or $CaTiO_3$ or, more particularly ones having a structure $ABO_{3-\delta}$, such as for example $La_{0.5}Sr_{0.5}Fe_{0.9}Ti_{0.1}O_{3-\delta}$ or $La_{0.6}Sr_{0.4}Fe_{0.9}Ga_{0.1}O_{3-\delta}$;

- or from materials of the nonoxide (carbide, nitride, boride) type such as for example silicon carbide (SiC) or boron nitride (BN);
- or from metals such as for example nickel, platinum, palladium or rhodium.

According to a first particular aspect of the composite as defined above, compound ($C_1$) is chosen from oxides of formula (I):

$$(R_aO_b)_{1-x}(R_cO_d)_x \qquad (I),$$

in which:
$R_a$ represents at least one trivalent or tetravalent atom mainly chosen from bismuth (Bi), cerium (Ce), zirconium (Zr), thorium (Th), gallium (Ga) and hafnium (Hf), and a and b are such that the structure $R_aO_b$ is electrically neutral;

$R_c$ represents at least one divalent or trivalent atom chosen mainly from magnesium (Mg), calcium (Ca), barium (Ba), strontium (Sr), gadolinium (Gd), scandium (Sc), ytterbium (Yb), yttrium (Y), samarium (Sm), erbium (Er), indium (In), niobium (Nb) and lanthanum (La), and c and d are such that the structure $R_cO_d$ is electrically neutral; and in which x is generally between 0.05 and 0.30 and more particularly between 0.075 and 0.15.

Examples of oxides of formula (I) include cerium stabilized oxides, gallates and zirconias.

According to this first particular aspect, compound ($C_1$) is preferably chosen from stabilized zirconias of formula (Ia):

$$(ZrO_2)_{1-x}(Y_2O_3)_x \qquad (Ia),$$

in which x is between 0.05 and 0.15.

According to a second particular aspect of the composite as defined above, compound ($C_1$) is chosen from perovskites of formula (II):

$$[Ma_{1-x-u}Ma'_xMa''_u][Mb_{1-y-v}Mb'_yMb''_v]O_{3-w} \qquad (II)$$

in which:
Ma represents an atom chosen from scandium, yttrium, or from the families of lanthanides, actinides or alkaline-earth metals;

Ma', which is different from Ma, represents an atom chosen from scandium, yttrium or from the families of lanthanides, actinides or alkaline-earth metals;

Ma'', which is different from Ma and Ma', represents an atom chosen from aluminum (Al), gallium (Ga), indium (In), thallium (Tl) or from the family of alkaline-earth metals;

Mb represents an atom chosen from transition metals;

Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);

Mb'', which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);

$0 < x \leq 0.5$;
$0 \leq u \leq 0.5$;
$(x+u) \leq 0.5$;
$0 \leq y \leq 0.9$;
$0 \leq v \leq 0.9$;
$0 \leq (y+v) \leq 0.9$; and
w is such that the structure in question is electrically neutral.

According to this second particular aspect, compound ($C_1$) is more particularly chosen from compounds of formula (II) in which u is equal to zero or else from compounds of formula (II) in which u is different from zero or else from compounds of formula (II) in which the sum (y+v) is equal to zero or else from compounds of formula (II) in which the sum (y+v) is different from zero.

In formula (II) as defined above, Ma is more particularly chosen from La, Ce, Y, Gd, Mg, Ca, Sr and Ba. In this case, compound ($C_1$) is preferably a compound of formula (IIa):

$$La_{(1-x-u)}Ma'_xMa''_uMb_{(1-y-v)}Mb'_yMb''_vO_{3-\delta} \qquad (IIa),$$

corresponding to formula (II), in which Ma represents a lanthanum atom.

In formula (II) as defined above, Ma' is more particularly chosen from La, Ce, Y, Gd, Mg, Ca, Sr and Ba. In this case, compound ($C_1$) is preferably a compound of formula (IIb):

$$Ma_{(1-x-u)}Sr_xMa''_uMb_{(1-y-v)}Mb'_yMb''_vO_{3-\delta} \qquad (IIb),$$

corresponding to formula (II) in which Ma'' represents a strontium atom.

In formula (II) as defined above, Mb is more particularly chosen from Fe, Cr, Mn, Co, Ni and Ti. In this case, compound ($C_1$) is preferably a compound of formula (IIc):

$$Ma_{(1-x-u)}Ma'_xMa''_uFe_{(1-y-v)}Mb'_yMb''_vO_{3-\delta} \qquad (IIc),$$

corresponding to formula (II) in which Mb represents an iron atom.

In formula (II) as defined above, Mb' is more particularly chosen from Co, Ni, Ti and Ga while Mb'' is more particularly chosen from Ti and Ga.

In this case, compound ($C_1$) is preferably a compound of formula (IId):

$$La_{(1-x)}Sr_xFe_{(1-v)}Mb''_vO_{3-\delta} \qquad (IId),$$

corresponding to formula (II) in which u=0, y=0, Mb represents an iron atom, Ma represents a lanthanum atom and Ma' represents a strontium atom. In formula (II) as defined above, Ma" is more particularly chosen from Ba, Ca, Al and Ga. In the composite according to the present invention, compound ($C_1$) is more particularly a compound of formula:

$$La_{(1-x-u)}Sr_xAl_uFe_{(1-v)}Ti_vO_{3-\delta}, La_{(1-x-u)}Sr_xAl_uFe_{(1-v)}Ga_vO_{3-\delta}, La_{(1-x)}Sr_xFe_{(1-v)}Ti_vO_{3-\delta}, La_{(1-x)}Sr_xTi_{(1-v)}Fe_vO_{3-\delta},$$

$La_{(1-x)}Sr_xFe_{(1-v)}Ga_vO_{3-\delta}$ or $La_{(1-x)}Sr_xFeO_{3-\delta}$ and more particularly one of the following compounds: $La_{0.6}Sr_{0.4}Fe_{0.9}Ga_{0.1}O_{3-\delta}$, or $La_{0.5}Sr_{0.5}Fe_{0.9}Ti_{0.1}O_{3-\delta}$.

Among the compounds with a crystal structure of the perovskite type of formula (II) that are preferred to be used in the composite according to the present invention are those of formula (II'):

$$Ma^{(a)}{}_{(1-x-u)}Ma'^{(a-1)}{}_xMa''^{(a'')}{}_uMb^{(b)}{}_{(1-s-y-v)}Mb^{(b+1)}{}_sMb'^{(b+\beta)}{}_yMb''^{(b'')}{}_vO_{3-\delta} \quad (II'),$$

in which formula (II'):
a, a−1, a", b, (b+1), (b+β) and b" are integers representing the respective valences of the Ma, Ma', Ma", Mb, Mb' and Mb" atoms; and a, a", b, b", β, x, y, s, u, v and δ are such that the electrical neutrality of the crystal lattice is preserved:

a>1;
a", b and b" are greater than zero;
−2≦β≦2;
a+b=6;
0<s<x;
0<x≦0.5;
0≦u≦0.5;
(x+u)≦0.5;
0≦y≦0.9;
0≦v≦0.9;
0≦(y+v+s)≦0.9;
[u(a"−a)+v(b"−b)−x+s+βy+2δ]=0; and
$\delta_{min}<\delta<\delta_{max}$ where
$\delta_{min}=[u(a-a")+v(b-b")-\beta y]/2$ and
$\delta_{max}=[u(a-a")+v(b-b")-\beta y+x]/2$
and Ma, Ma', Ma", Mb, Mb' and Mb" are as defined above, Mb representing an atom chosen from transition metals capable of existing in several possible valences.

According to a third particular aspect of the material as defined above, compound ($C_1$) is chosen from materials of the brown-millerite family of formula (III):

$$[Mc_{2-x}Mc'_x][Md_{2-y}Md'_y]O_{6-w} \quad (III)$$

in which,
Mc represents an atom chosen from scandium, yttrium or from the families of lanthanides, actinides and alkaline-earth metals;
Mc', which is different from Mc, represents an atom chosen from scandium, yttrium or from the families of lanthanides, actinides and alkaline-earth metals;
Md represents an atom chosen from transition metals; and
Md', which is different from Md, represents an atom chosen from transition metals, aluminum (Al), indium (In), gallium (Ga), germanium (Ge), antimony (Sb), bismuth (Bi), tin (Sn), lead (Pb) and titanium (Ti); and x and y are greater than or equal to 0 and less than or equal to 2 and w is such that the structure in question is electrically neutral.

According to this third particular aspect of the material according to the present invention, compound ($C_1$) is more particularly of formula (IIIa):

$$[Mc_{2-x}La_x][Md_{2-y}Fe_y]O_{6-w} \quad (IIIa),$$

a compound of formula (IIIb):

$$[Sr_{2-x}La_x][Ga_{2-y}Md'_y]O_{6-w} \quad (IIIb)$$

and more particularly a compound of formula (IIIc):

$$[Sr_{2-x}La_x][Ga_{2-y}Fe_y]O_{6-w} \quad (IIIc),$$

such as for example compounds of formula:

$Sr_{1.4}La_{0.6}GaFeO_{5.3}$; $Sr_{1.6}La_{0.4}Ga_{1.2}Fe_{0.8}O_{5.3}$; $Sr_{1.6}La_{0.4}GaFeO_{5.2}$;

$Sr_{1.6}La_{0.4}Ga_{0.8}Fe_{1.2}O_{5.2}$; $Sr_{1.6}La_{0.4}Ga_{0.6}Fe_{1.4}O_{5.2}$; $Sr_{1.6}La_{0.4}Ga_{0.4}Fe_{1.6}O_{5.2}$;

$Sr_{1.6}La_{0.4}Ga_{0.2}Fe_{1.8}O_{5.2}$; $Sr_{1.6}La_{0.4}Fe_2O_{5.2}$; $Sr_{1.7}La_{0.3}GaFeO_{5.15}$;

$Sr_{1.7}La_{0.3}Ga_{0.8}Fe_{1.2}O_{5.15}$; $Sr_{1.7}La_{0.3}Ga_{0.6}Fe_{1.4}O_{5.15}$; $Sr_{1.7}La_{0.3}Ga_{0.4}Fe_{1.6}O_{5.15}$;

$Sr_{1.7}La_{0.3}Ga_{0.2}Fe_{1.8}O_{5.15}$; $Sr_{1.8}La_{0.2}GaFeO_{5.1}$; $Sr_{1.8}La_{0.2}Ga_{0.4}Fe_{1.6}O_{5.1}$;

or $Sr_{1.8}La_{0.2}Ga_{0.2}Fe_{1.8}O_{5.1}$.

According to one more particular aspect of the present invention, the subject thereof is a composite as defined above in which compound ($C_1$) is chosen from compounds of formula:

$La_{0.6}Sr_{0.4}Fe_{0.9}Ga_{0.1}O_{3-\delta}$ or $La_{0.5}Sr_{0.5}Fe_{0.9}Ti_{0.1}O_{3-\delta}$, and compound ($C_2$) is chosen from magnesium oxide (MgO), aluminum oxide ($Al_2O_3$), mixed strontium aluminum oxide $Sr_3Al_2O_6$ and mixed barium titanium oxide ($BaTiO_3$).

According to the latter particular aspect, the composite which comprises between 2 and 10 vol % magnesium oxide (MgO) and between 90 and 98 vol % $La_{0.6}Sr_{0.4}Fe_{0.9}Ga_{0.1}O_{3-\delta}$ is preferred.

According to a second aspect, another subject of the invention is a method of preparing the composite as defined above, characterized in that it includes at least one step of sintering a powder blend of compound ($C_1$) and compound ($C_2$), while controlling the oxygen partial pressure ($pO_2$) of the gaseous atmosphere surrounding the reaction mixture.

In the method as defined above, the sintering temperature of the composite is between 800° C. and 1500° C., preferably between 1000° C. and 1350° C.

The sintering includes two simultaneous phenomena that are generally in competition, namely densification of the material by elimination of the porosity and grain growth. If the densification of the material has to be maximized for its use as a mixed conductor, crystal growth can be detrimental to its mechanical properties. The sintering step must therefore be adapted in order to result in densification of the part while minimizing grain growth. However, it is often difficult for these two conditions, depending on the nature of the materials used, or of the imposed sintering conditions, to be met. The presence of a suitable amount of compound ($C_2$) in the mixed conductor ensures satisfactory densification while limiting, or even preventing, crystalline growth of the conductor ($C_1$).

The method as defined above is more particularly used in such a way that the sintering step is carried out in a gaseous atmosphere having an oxygen partial pressure of 0.1 Pa or less.

According to another particular aspect, the method as defined above is characterized in that the powder blend of compound (C1) and compound (C2) undergoes, before the sintering step, a forming step followed by binder removal.

According to another aspect, another subject of the invention is the use of the composite as defined above, as a mixed conducting composite for a catalytic membrane reactor, intended to be used for the synthesis of syngas by catalytic oxidation of methane or natural gas and/or as mixed conducting composite for a ceramic membrane intended to be used for separating oxygen from air.

The final subject of the invention is a method for inhibiting and/or controlling the crystal growth of the grains of mixed electronic/oxide ionic conducting compounds during the sintering step in the preparation of a catalytic membrane reactor, characterized in that it includes a prior step of blending 75 to 99.99 vol % of mixed conductor ($C_1$) with 0.01 to 25 vol % of compound ($C_2$).

According to a preferred aspect of the method as defined above, this includes a prior step of blending 90 to 98 vol % $La_{0.6}Sr_{0.4}Fe_{0.9}Ga_{0.1}O_{3-\delta}$ with 2 to 10 vol % magnesium oxide (MgO).

BRIEF DESCRIPTION OF THE SEVERAL VIEWS OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 shows two images obtained by scanning electron microscopy with two different magnifications (FIG. 1*a*: ×8000 and FIG. 1*b*: ×10000).

FIG. 2 shows maps of the constituent elements of the membrane, obtained by EDS analysis.

FIG. 3 shows by X-ray diffraction the fact that the MgO (40 vol %)/$La_{0.6}Sr_{0.4}Fe_{0.9}Ga_{0.1}O_{3-\delta}$ (60 vol %) blend does not result, after being calcined at 1200° C. for a few hours in nitrogen, in any new compounds.

FIG. 4 shows by X-ray diffraction that the $BaTiO_3$ (40 vol %)/$La_{0.6}Sr_{0.4}Fe_{0.9}Ga_{0.1}O_{3-\delta}$ (60 vol %) blend does not result, after being calcined in nitrogen at 1200° C. for a few hours, in any new compounds.

DETAILED DESCRIPTION OF THE INVENTION

Manufacture of the Multiphase Composite

Figure 5:
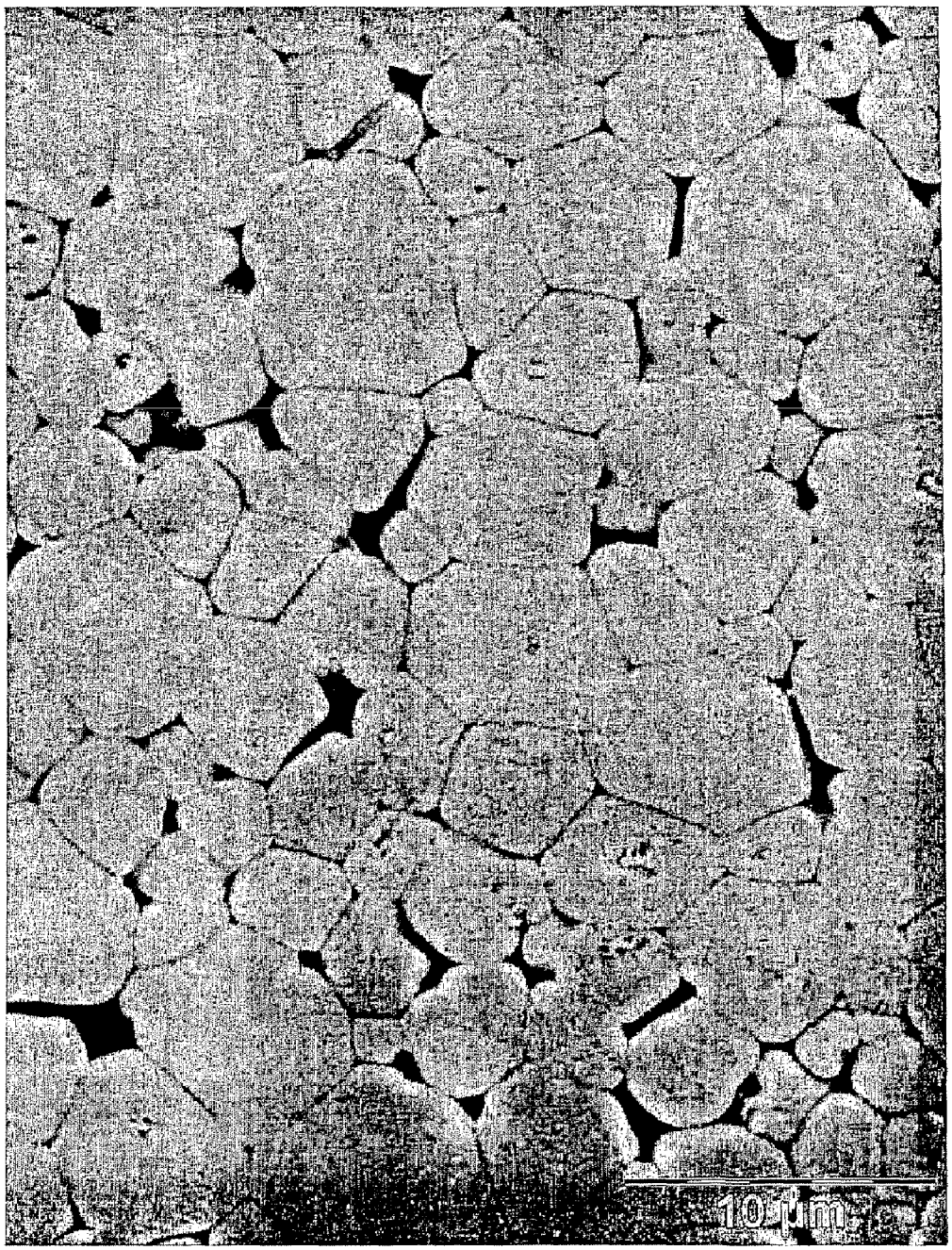
FIG. 5 is a secondary-electron SEM micrograph of the composite containing no blocking agent (magnification: ×3000; grain size between 2 and 10 μm).

The blocking agent is generally obtained from a commercial powder of high purity or from a powder blend. It may also be synthesized from oxide and/or nitrate and/or carbonate precursors blended and homogenized in a suitable manner. This precursor blend is then calcined at high temperature, between 800° C. and 1400° C., in order to react and form the desired composite or composites, these being checked by X-ray diffraction. If necessary, the precursor powder is milled, preferably by attrition milling, in order to tighten the particle size distribution and reduce the grain size, for example to 0.5 μm. The steps of forming the composite, consisting of the uniform blend of particles ($C_2$) in the matrix ($C_1$), and of binder removal are identical to those for only the mixed ($C_1$) conductor.

The high-temperature heat treatment is generally adapted to the presence of the blocking agent, which facilitates sintering.

Example 1

MgO (5 vol %)/$La_{0.5}Sr_{0.5}Fe_{0.9}Ti_{0.1}O_{3-\delta}$ (95 vol %) Ceramic Membrane The example presented is a blend according to the protocol described above, consisting of 5 vol % magnesia (MgO) (compound $C_2$) and 95 vol % of the ceramic $La_{0.5}Sr_{0.5}Fe_{0.9}Ti_{0.1}O_{3-\delta}$ (compound $C_1$). The sintering was carried out in nitrogen at 1150° C. for 1.5 h.

FIG. 1 shows two images obtained by scanning electron microscopy with two different magnifications (FIG. 1*a*: ×8000 and FIG. 1*b*: ×10000). These images show that the MgO grains are distributed uniformly within the matrix, and have a size of less than 1 μm. The $La_{0.5}Sr_{0.5}Fe_{0.9}Ti_{0.1}O_{3-\delta}$ grains are all smaller than 2 μm.

An $La_{0.5}Sr_{0.5}Fe_{0.9}Ti_{0.1}O_{3-\delta}$ membrane containing no MgO and sintered under the same conditions (in nitrogen at 1150° C. for one hour and a half) had grain sizes of between 2 and 3 μm.

FIG. 2 shows maps of the constituent elements of the membrane, obtained by EDS analysis. It may be seen that all the elements are uniformly distributed. These maps clearly demonstrate the chemical nonreactivity of the MgO blocking agent with respect to $La_{0.5}Sr_{0.5}Fe_{0.9}Ti_{0.1}O_{3-\delta}$.

Example 2

MgO (5 vol %)/$La_{0.6}Sr_{0.4}Fe_{0.9}Ga_{0.1}O_{3-\delta}$ (95 vol %) Ceramic Membrane The example presented is a blend according to the protocol described above, consisting of 5 vol % magnesia (MgO) (compound $C_2$) and 95% of the ceramic $La_{0.6}Sr_{0.4}Fe_{0.9}Ga_{0.1}O_{3-\delta}$ (abbreviated in the figures to LSFG; compound $C_1$). The sintering was carried out in nitrogen at 1235° C. for two hours.

FIG. 3 shows by X-ray diffraction the fact that the MgO (40 vol %)/$La_{0.6}Sr_{0.4}Fe_{0.9}Ga_{0.1}O_{3-\delta}$ (60 vol %) blend does not result, after being calcined at 1200° C. for a few hours in nitrogen, in any new compounds. The X-ray diffraction diagram demonstrates that there is no chemical reactivity between the MgO blocking agent and the $La_{0.6}Sr_{0.4}Fe_{0.9}Ga_{0.1}O_{3-\delta}$ ceramic matrix.

FIG. 4 shows by X-ray diffraction that the $BaTiO_3$ (40 vol %)/$La_{0.6}Sr_{0.4}Fe_{0.9}Ga_{0.1}O_{3-\delta}$ (60 vol %) blend does not result, after being calcined in nitrogen at 1200° C. for a few hours, in any new compounds. The X-ray diffraction diagram demonstrates that there is no chemical reactivity between the $BaTiO_3$ blocking agent and the $La_{0.6}Sr_{0.4}Fe_{0.9}Ga_{0.1}O_{3-\delta}$ ceramic matrix.

FIG. 5 is a secondary-electron SEM micrograph of the composite containing no blocking agent (magnification: ×3000; grain size between 2 and 10 μm). The sintering step was carried out in nitrogen for 2 hours at 1235° C. (composite of the prior art).

Figure 6:
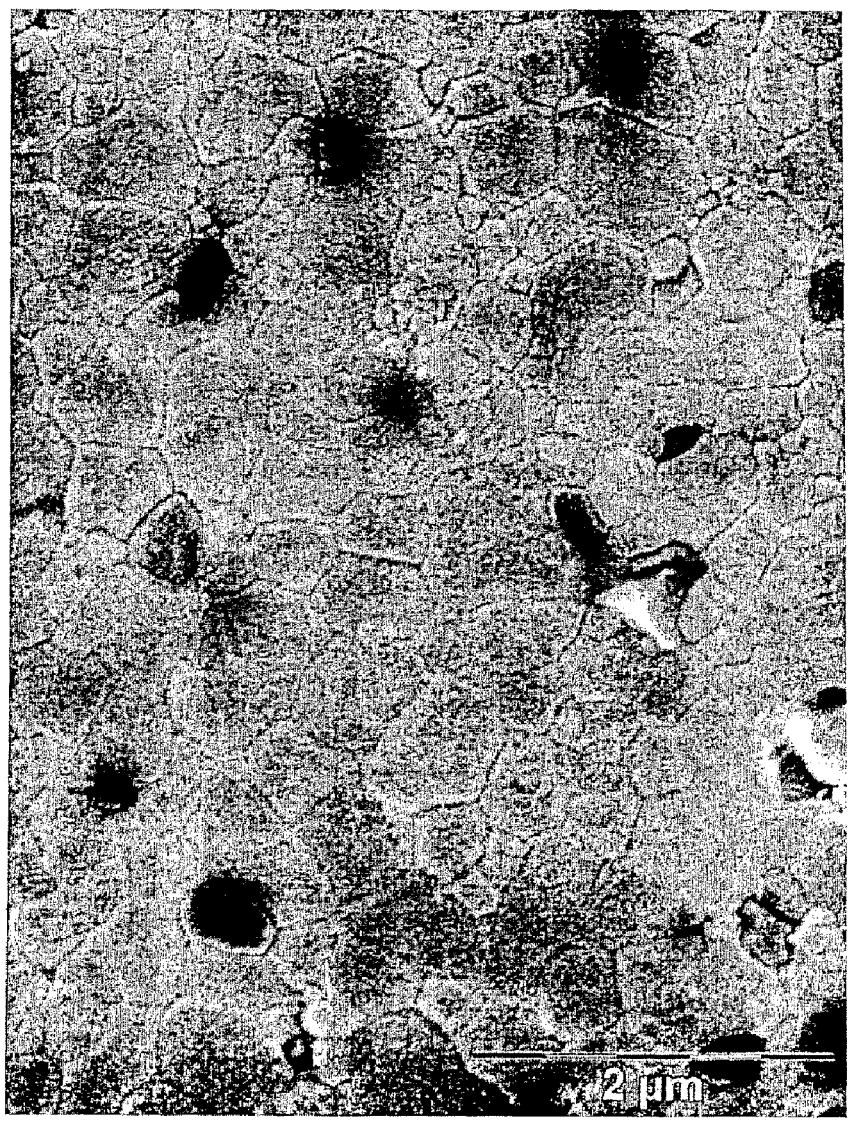
FIG. 6 is a secondary-electron SEM micrograph of the $La_{0.6}Sr_{0.4}Fe_{0.9}Ga_{0.1}O_{3-\delta}$ composite containing 5 vol % magnesium oxide as blocking agent (magnification: ×20000; grain size between 0.1 and 1 μm).

FIG. 6 is a secondary-electron SEM micrograph of the $La_{0.6}Sr_{0.4}Fe_{0.9}Ga_{0.1}O_{3-\delta}$ composite containing 5 vol % magnesium oxide as blocking agent (magnification: ×20000; grain size between 0.1 and 1 μm). The sintering step was carried out in nitrogen for 2 hours at 1235° C.

Figure 7:
FIG. 7 is a secondary-electron SEM micrograph of the $La_{0.6}Sr_{0.4}Fe_{0.9}Ga_{0.1}O_{3-\delta}$ composite containing 5 vol % magnesium oxide as blocking agent (magnification: ×50000; grain size between 0.2 and 1.6 μm).

FIG. 7 is a secondary-electron SEM micrograph of the $La_{0.6}Sr_{0.4}Fe_{0.9}Ga_{0.1}O_{3-\delta}$ composite containing 5 vol % magnesium oxide as blocking agent (magnification: ×50000; grain size between 0.2 and 1.6 μm). The sintering step was carried out in nitrogen for 2 hours at 1300° C.

Example 3

Influence of the Presence of Magnesium Oxide (MgO) in $La_{0.6}Sr_{0.4}Fe_{0.9}Ga_{0.1}O_{3-\delta}$ (LSFG) on the Oxygen Permeability of the Membrane a) Preparation of the Specimens LSFG and MgO powders were weighed and blended in different proportions by volume in order to obtain compositions comprising (100–x) vol % LSFG and x vol % MgO, where x=0; 2; 5.

Figure 8:
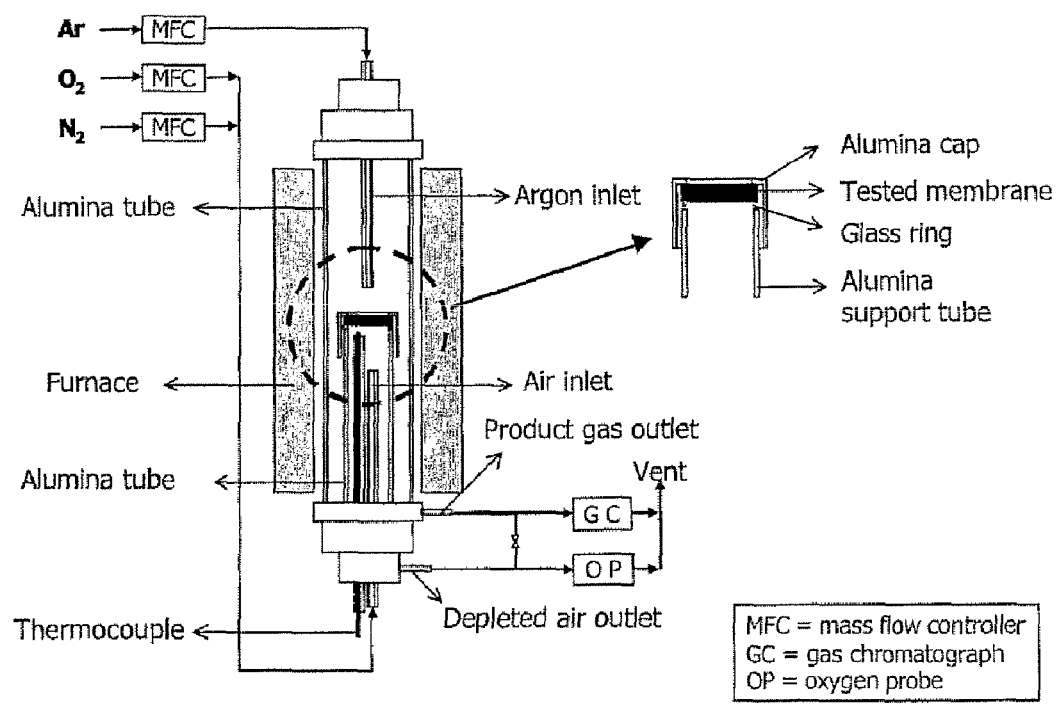
FIG. 8 is device used to carry out permeation measurements including a tube furnace and gas feeds and analyzers (gas chromatography—YSZ-based oxygen probe).

Dense membranes with a thickness of about 1 mm and an area of 3.1 cm² were prepared from these compositions (LSFG (x=0); LSFG/2M (x=2); LSFG/5M (x=5)) using the tape casting process described in *The Encyclopedia of Advanced Materials*, Volume 4, Pergamon 1994, Cambridge, 2763-2767 by T. Chartier, and in which the binder removal step was carried out with a slow heating rate and the sintering step was carried out between 1250° C. and 1350° C. for 2 h in a 90% nitrogen/10% oxygen atmosphere. The permeation measurements were carried out with the device shown in FIG. 8, consisting of a tube furnace and gas feeds and analyzers (gas chromatography—YSZ-based oxygen probe).

The dense membranes of pure (LSFG) phase and composite (LSFG/2M; LSFG/5M) phase were deposited at the top of an alumina tube, sealing between the inside and outside of the tube being provided by a glass ring located between the support tube and the membrane and by an alumina cap in order to hold it in place and to exert pressure from above.

The entire device was inserted into the tube furnace, which was heated up to the glass transition temperature of the glass ring.

Before sealing, the membranes were subjected to a stream of argon over their external surface and a stream of recombined air (79% $N_2$/21% $O_2$) on their internal face with flow rates of 200 ml (STP)/min. The gases exiting the device were analyzed using a chromatograph in order to validate the 100% selectivity with respect to oxygen and using an oxygen probe to determine the oxygen permeation flux through each of the composites.

b) Results

Figure 9:
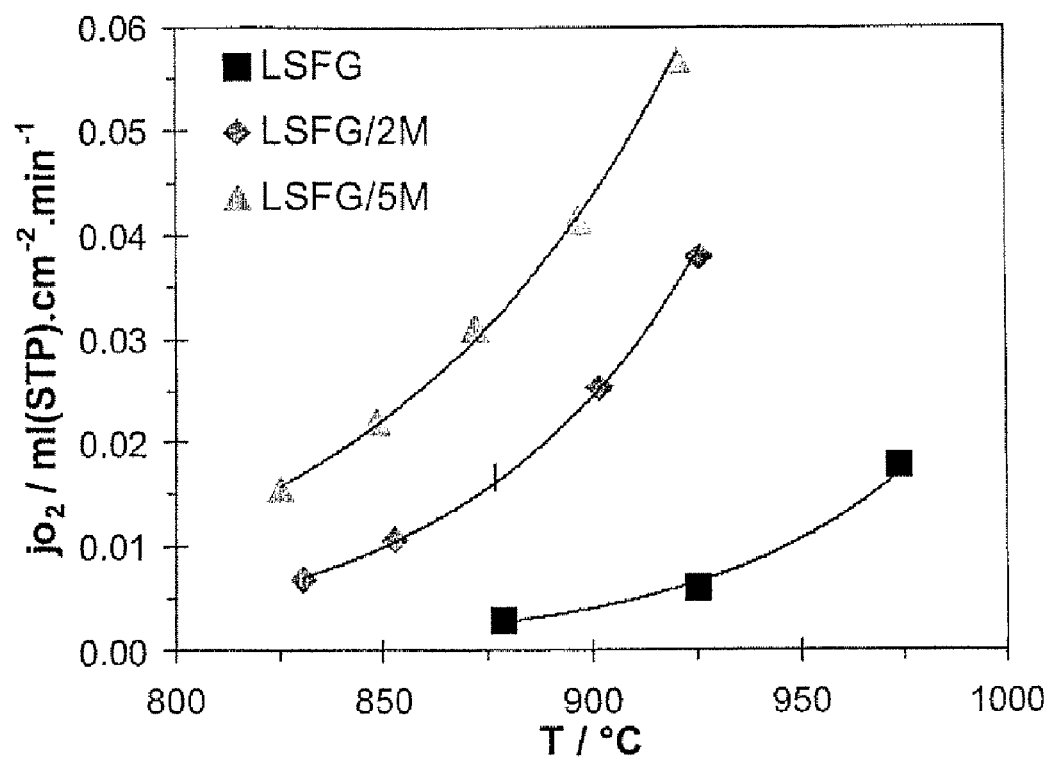
FIG. 9 shows curves of the variation in oxygen flux as a function of temperature for each of the composites.

FIG. 9 shows curves of the variation in oxygen flux as a function of temperature for each of the composites. It demonstrates the multiplicative factor (MF) caused by the oxygen flux thanks to the presence of blocking agents (at 950° C., MF=4 in the case of LSFG/2M compared with LSFG, and MF=6 in the case of LSFG/5M compared with LSFG).

Figure 10:
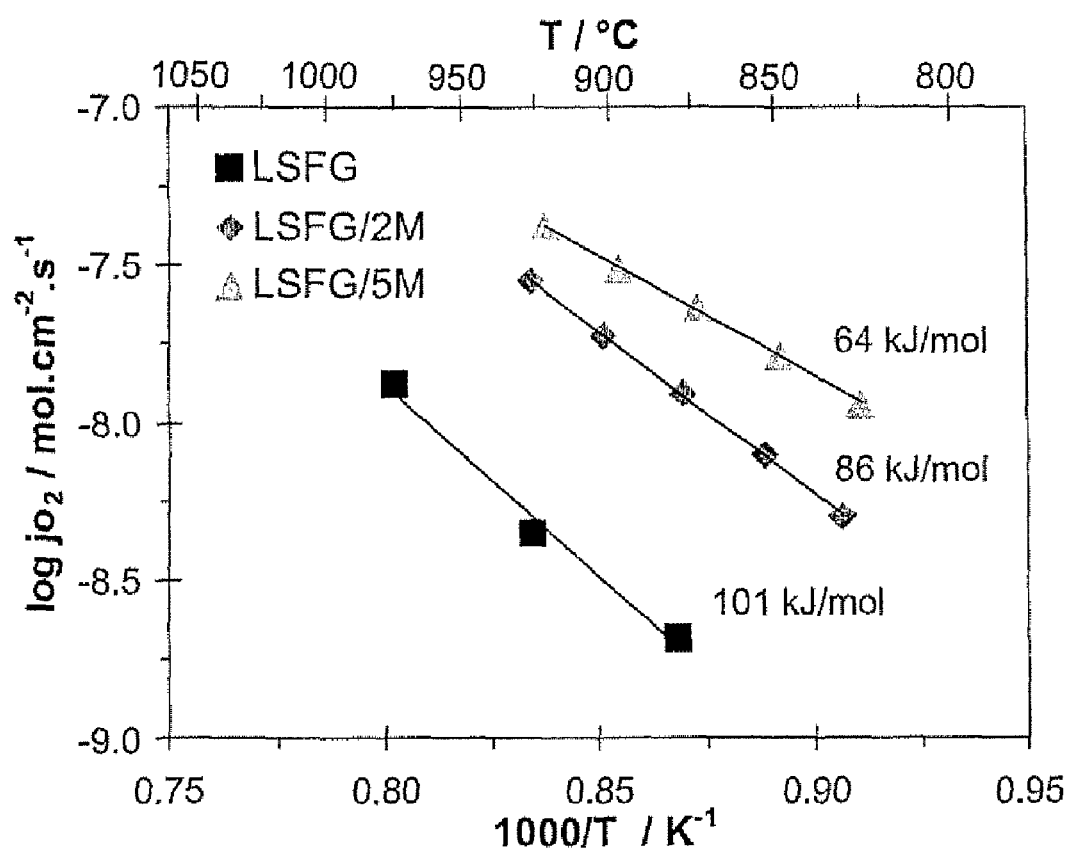
FIG. 10 shows the impact of the membrane microstructure on the activation energy of the oxygen permeation flux, which energy decreases when the proportion of magnesium oxide increases.

FIG. 10 shows the impact of the membrane microstructure on the activation energy of the oxygen permeation flux, which energy decreases when the proportion of magnesium oxide increases.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of preparing a composite, comprising the steps of:
sintering a powder blend while controlling an oxygen partial pressure (pO₂) of a gaseous atmosphere surrounding the powder blend;
before said step of sintering, forming a shape from the powder blend, wherein:
the powder blend comprises binder, a mixed electronic/oxygen $O^{2-}$ anionic conducting compound ($C_1$) and a compound ($C_2$) chosen from MgO and $BaTiO_3$;
the resultant composite comprises at least 75 vol % of compound ($C_1$), from 0.01 to 25 vol % of compound ($C_2$), and from 0 vol % to 2.5 vol % of compound ($C_3$), compound ($C_3$) produced from at least one chemical reaction represented by the equation:

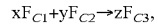

$xF_{C1}+yF_{C2}\rightarrow zF_{C3}$, in which equation $F_{C1}$, $F_{C2}$ and $F_{C3}$ represent the respective crude formulae of compounds ($C_1$), ($C_2$) and ($C_3$) and x, y and z represent rational numbers greater than or equal to 0;
compound ($C_1$) is chosen from perovskite oxides of formula (II):

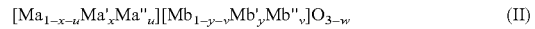

$[Ma_{1-x-u}Ma'_xMa''_u][Mb_{1-y-v}Mb'_yMb''_v]O_{3-w}$ (II)

wherein:
Ma represents an atom chosen from scandium, yttrium, or from the families of lanthanides, actinides or alkaline-earth metals;
Ma', which is different from Ma, represents an atom chosen from scandium, yttrium or from the families of lanthanides, actinides or alkaline-earth metals;
Ma", which is different from Ma and Ma', represents an atom chosen from aluminum (Al), gallium (Ga), indium (In), thallium (Tl) or from the family of alkaline-earth metals;
Mb represents an atom chosen from transition metals;
Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);
Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);
$0<x\leq0.5$;
$0\leq u\leq0.5$;
$(x+u)\leq0.5$;
$0\leq y\leq0.9$;
$0\leq v\leq0.9$;
$0\leq(y+v)\leq0.9$; and
w is such that the structure in question is electrically neutral; and
after said step of forming and before said step of sintering, removing the binder from the powder blend.

2. The method of claim 1, in which the grains of compound ($C_2$) have an equiaxed shape with a diameter ranging from 0.1 µm to 5 µm and preferably less than 1 µm.

3. The method of claim 1, in which the volume fraction of compound ($C_3$) does not exceed 1.5%.

4. The method of claim 3, in which the volume fraction of compound ($C_3$) in the composite tends toward 0.

5. The method of claim 1, in which the volume fraction of compound ($C_2$) is not less than 0.1% but does not exceed 10%.

6. The method of claim 5, in which the volume fraction of compound ($C_2$) does not exceed 5%.

7. The method of claim 1, in which compound ($C_1$) is chosen from compounds of formula (IIa):

$$La_{(1-x-u)}Ma'_xMa''_uMb_{(1-y-v)}Mb'_yMb''_vO_{3-\delta} \quad (IIa),$$

wherein Ma represents a lanthanum atom.

8. The method of claim 1, in which compound ($C_1$) is chosen from compounds of formula (IIb):

$$Ma_{(1-x-u)}Sr_xMa''_uMb_{(1-y-v)}Mb'_yMb''_vO_{3-\delta} \quad (IIb),$$

wherein Ma' represents a strontium atom.

9. The method of claim 1, in which compound ($C_1$) is chosen from compounds of formula (IIc):

$$Ma_{(1-x-u)}Ma'_xMa''_uFe_{(1-y-v)}Mb'_yMb''_vO_{3-\delta} \quad (IIc),$$

wherein Mb represents an iron atom.

10. The method of claim 1, in which compound ($C_1$) is chosen from compounds of formula (IId):

$$La_{(1-x)}Sr_xFe_{(1-v)}Mb''_vO_{3-\delta} \quad (IId),$$

wherein u=0, y=0, Mb represents an iron atom, Ma represents a lanthanum atom, and Ma' represents a strontium atom.

11. The method of claim 1, in which compound ($C_1$) is a compound of formula:

$$La_{(1-x-u)}Sr_xAl_uFe_{(1-v)}Ti_vO_{3-\delta},$$

$$La_{(1-x-u)}Sr_xAl_uFe_{(1-v)}Ga_vO_{3-\delta},$$

$$La_{(1-x)}Sr_xFe_{(1-v)}Ti_vO_{3-\delta},$$

$$La_{(1-x)}Sr_xTi_{(1-v)}Fe_vO_{3-\delta},$$

$$La_{(1-x)}Sr_xFe_{(1-v)}Ga_vO_{3-\delta} \text{ or}$$

$$La_{(1-x)}Sr_xFeO_{3-\delta}.$$

12. The method of claim 11, in which compound ($C_1$) is a compound of formula:

$$La_{0.6}Sr_{0.4}Fe_{0.9}Ga_{0.1}O_{3-\delta}, \text{ or}$$

$$La_{0.6}Sr_{0.6}Fe_{0.9}Ti_{0.1}O_{3-\delta}.$$

13. The method of claim 1, wherein:
compound ($C_1$) is chosen from those of formula (II'):

$$Ma^{(a)}{}_{(1-x-u)}Ma'^{(a-1)}{}_xMa''^{(a'')}{}_uMb^{(b)}{}_{(1-s-y-v)}Mb^{(b+1)}{}_s Mb'^{(b+\beta)}{}_yMb''^{(b'')}{}_vO_{3-\delta} \quad (II');$$

a, a−1, a", b, (b+1), (b+β) and b" are integers representing the respective valences of the Ma, Ma', Ma", Mb, Mb' and Mb" atoms; and a, a", b, b", β, x, y, s, u, v and δ are such that the electrical neutrality of the crystal lattice is preserved, a>1;
a", b and b" are greater than zero;
−2≤β≤2;
a+b=6;
0<s<x;
0<x≤0.5;
0≤u≤0.5;
(x+u)≤0.5;
0≤y≤0.9;
0≤v≤0.9;
0≤(y+v+s)≤0.9;
[u(a"−a)+v(b"−b)−x+s+βy+2δ]=0;
$\delta_{min}<\delta<\delta_{max}$;
$\delta_{min}=[u(a-a")+v(b-b")-\beta y]/2$;
$\delta_{max}=[u(a-a")+v(b-b")-\beta y+x]/2$;
Ma, Ma', Ma", Mb, Mb' and Mb" are as defined above; and
Mb represents an atom chosen from transition metals capable of existing in several possible valences.

14. The method of claim 1, wherein compound ($C_1$) is chosen from compounds of formula:

$$La_{0.6}Sr_{0.4}Fe_{0.9}Ga_{0.1}O_{3-\delta}, \text{ or}$$

$$La_{0.5}Sr_{0.5}Fe_{0.9}Ti_{0.1}O_{3-\delta}.$$

15. The method of claim 14, wherein:
compound ($C_2$) is magnesium oxide (MgO);
compound ($C_1$) is $La_{0.6}Sr_{0.4}Fe_{0.9}Ga_{0.1}O_{3-\delta}$; and
the resultant composite comprises between 2 and 10 vol % of compound ($C_2$) and between 90 and 98 vol % of compound ($C_1$).

16. The method of claim 1, in which the gaseous atmosphere surrounding the powder blend has an oxygen partial pressure of 0.1 Pa or less.

17. The method of claim 1, in which the volume fraction of compound ($C_3$) does not exceed 0.5% by volume.

* * * * *